United States Patent [19]

Valia

[11] Patent Number: 5,151,472
[45] Date of Patent: Sep. 29, 1992

[54] METHOD OF PREPARING RIGID ROD POLYMERS IN THERMOPLASTIC MATRICES

[75] Inventor: David A. Valia, San Diego, Calif.

[73] Assignee: General Dynamics Corporation, Convair Division, San Diego, Calif.

[21] Appl. No.: 565,394

[22] Filed: Aug. 10, 1990

[51] Int. Cl.$^5$ .............................................. C08L 79/08
[52] U.S. Cl. .................................. 525/432; 525/180; 525/420; 525/425; 525/397; 525/436; 428/473.5
[58] Field of Search ................................ 525/432, 436

[56] References Cited

U.S. PATENT DOCUMENTS

| | | | |
|---|---|---|---|
| 4,207,407 | 6/1980 | Helminiak et al. | 525/425 |
| 4,631,318 | 12/1986 | Hwang et al. | 525/432 |
| 4,845,150 | 7/1989 | Kovak et al. | 525/432 |
| 4,954,578 | 9/1990 | Ree et al. | 525/432 |
| 5,021,517 | 6/1991 | Wang et al. | 525/417 |
| 5,041,506 | 8/1991 | Kumata et al. | 525/432 |

Primary Examiner—Ana L. Carrillo
Attorney, Agent, or Firm—John R. Duncan

[57] ABSTRACT

A high strength synthetic resin based structural material in which a polymer having coil-like molecules is uniformly mixed with a second polymer having rigid rod-like molecules. This material is made, basically, by dissolving a thermoplastic matrix polymer having coil-like molecules in a suitable solvent, adding thereto thermosetting polymer reactants which then form a prepolymer. The rigid rod prepolymer may then be partially cyclized through heat or by the use of a chemical agent in order to reduce chain conformations. Excess cyclizing agent can then be removed and the mixture can be heated to complete polymerization to produce a high strength structure with rigid rod-like molecules intimately blended with the matrix coil-like molecules.

14 Claims, 1 Drawing Sheet

METHOD OF PREPARING RIGID ROD POLYMERS IN THERMOPLASTIC MATRICES

BACKGROUND OF THE INVENTION

This invention relates in general to reinforced thermoplastic materials and, more specifically, to such materials in which the reinforcement is in the form of rigid rod-like polymer molecules.

High strength structural materials composed of high strength fibers such as glass, graphite or aramid fibers, embedded in a flexible matrix material, such as thermoplastic resins, have long been used. While these materials have excellent properties for many applications, they are often not suitable for thin film applications. Where the fibers are in the form of fiber fabrics or mats generally, significant reshaping of the composites is difficult. Also, manufacture of complex structures by methods such as injection molding is difficult even when the reinforcements are in the form of finely chopped fibers distributed through the matrix. These fiber reinforced materials also encounter problems with interfacial adhesion and differential thermal expansion when used for some purposes.

Recently, molecular composites in which rigid, rod-like polymers are mixed with a flexible, coil-like polymer to produce a higher strength reinforced products have been developed. Typical of these are the material disclosed by Helminiak, et al, in U.S. Pat. No. 4,207,407. While these materials show promise for use in high strength films, a number of problems remain. Obtaining uniform dispersion of the rod-like molecules has proven difficult. Phase separation and agglomeration problems during processing persist. Post processing of film materials and the production of complex shapes by techniques such as press forming and injection molding have not proven practical. Thus, there remains a continuing need for improved methods of synthesizing and processing these materials in order to achieve the properties needed for structural applications.

SUMMARY OF THE INVENTION

The above noted problems, and others, are overcome in accordance with this invention which basically comprises a high strength synthetic resin structural product in which coil-like molecules of a matrix resin are uniformly mixed with rigid rod-like molecules of a second resin. A purpose of this method is to produce a very uniform, tough, high strength product in which the coil-like molecules provide flexibility while the rod-like materials add strength.

A thermoplastic matrix polymer having coil-like molecules is initially dissolved in a suitable solvent at an elevated temperature while moisture is excluded. A stepwise polymerization of the rigid rod polymer is then carried out by adding the monomeric reactants to the mix, then forming a high polymer. A suitable cyclizing agent is then added to cause a partial cyclization of the rigid rod prepolymer, which serves to "lock" the matrix and rigid rod molecules together by lowering the molecular mobility which is caused by the reduced conformations of the molecule. The cyclizing agent is then removed, such as by filtration. The polymer mix is then typically placed on a forming surface as a thin layer or coating and heated at an elevated temperature for a period sufficient to produce a transparent dry flexible film. The film has considerably greater strength than did the original matrix polymer material. This film may be further physically processed as desired, such as by stacking and pressure laminating a number of films to produce a thicker structural product. Finally, the material is heated to a higher temperature for a suitable period to complete imidization. The product has superior strength properties while retaining considerable flexibility.

BRIEF DESCRIPTION OF THE DRAWING

The drawing is a schematic block flow sheet illustrating the steps in the method of this invention.

DETAILED DESCRIPTION OF PREFERRED EMBODIMENTS

Figure 1:
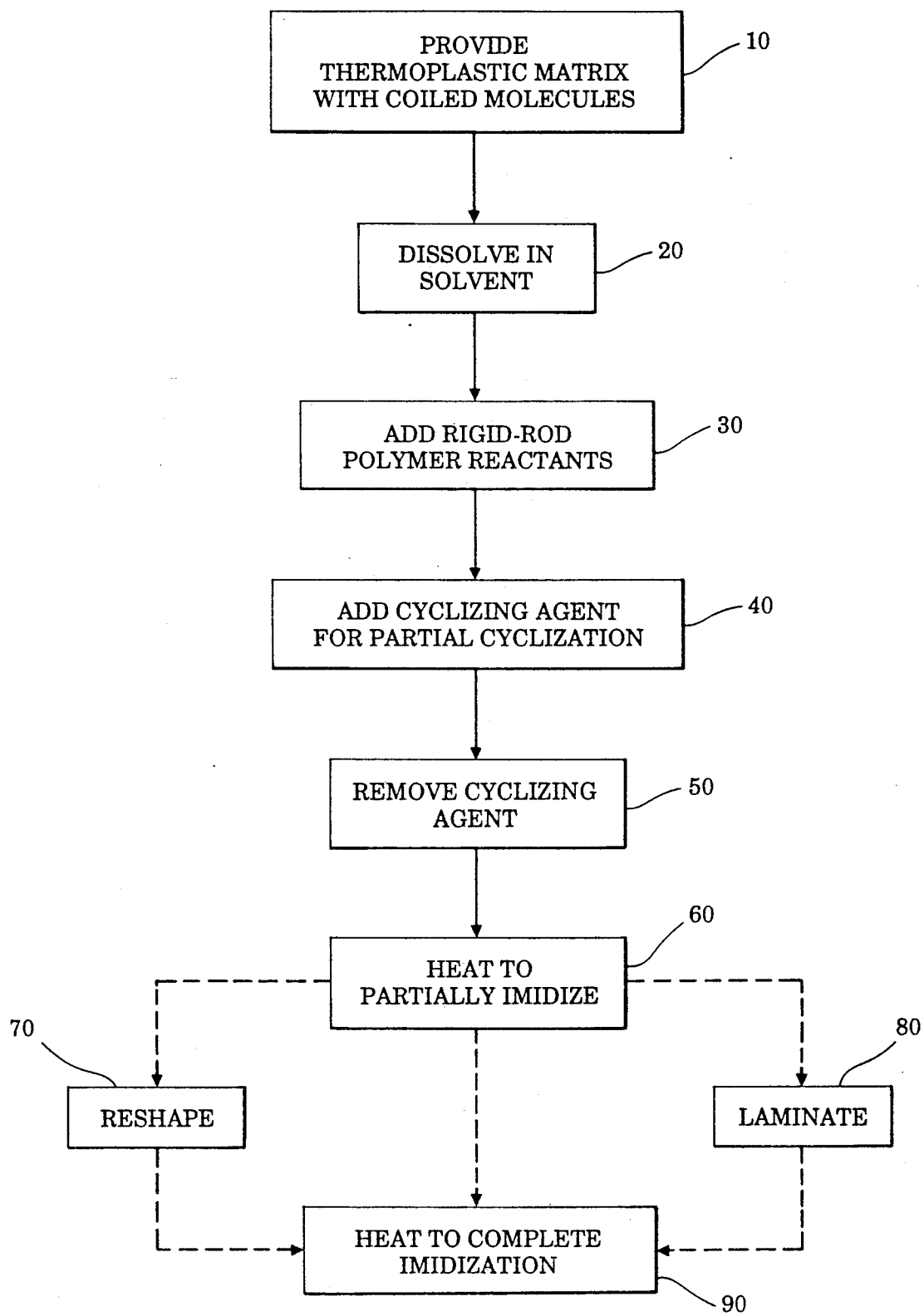

As indicated in Block 10 of the drawing, initially a thermoplastic matrix material is selected which has the desired coil-like molecular configuration.

Any suitable matrix thermoplastic material may be used. Desirable characteristics include rapid solubility at relatively low temperatures, the material should be readily cast from the solvent, forming high quality films, be of a molecular weight that would ease forming of complex structures, and include a functional group common to the rigid rod. Stated another way, if the rigid rod is composed of functionalities X,Y,Z, etc., the thermoplastic must also contain one of these functional groups as well. The matrix and rigid rod may be copolymers composed of several components with a multitude of functionalities, however, there must be at least one functional group common to both molecules. The higher the concentration of this functional group, the greater the degree of polymer-polymer affinity.

Typical thermoplastics include polyimides, acrylics, cellulose, polycarbonates, polyesters, polyphenylene oxide, polypropylene, polyethylene, polystyrene, polyvinylchloride, polyarylene sulfate, fluroplastics, thermoplastic liquid crystals, polyetheretherketone, polyetheretherketone and mixtures thereof. Of these, polyetherimides are preferred where the rigid rod inclusion in this case is a polyimide. This increases the molecular interaction between the two materials. Undesirable phase separation is further hindered due to the attraction of the acid functionality of the polyamic acid prepolymer to the basic ether groups of the thermoplastic. This causes an acid-base interaction to occur resulting in the formation of hydrogen bonds between the molecules.

Any suitable solvent may be used to dissolve the matrix thermoplastic material as indicated in Block 20. The solvents useful in the solution polymerization process for synthesizing the polyamic-acid compositions are the organic solvents whose functional groups do not react with either of the reactants (the diamines or the dianhydrides) to any appreciable extent. Besides being inert to the system and, preferably, being a solvent for the polyamic-acid, the organic solvent should be a solvent for at least one of the reactants, (preferably for both of the reactants) as well as the thermoplastic. To state it another way, the preferred organic solvent is an organic liquid other than a reactant or homologs of the reactants that is a solvent for the reactants and the thermoplastic, and contains functional groups, the functional groups being groups other than mono-functional primary and secondary amino groups, hydroxyl or thiol groups, and other than the monofunctional dicarboxylanhydro groups. The normally liquid organic solvents of the N,N-dialkylcarboxylamide class are particularly useful as solvents in the process of this invention. The optimum solvents are the lower molecular weight members of this class, particularly N,N-dimethylformamide and N,N-dimethylacetamide. They may easily be removed from the polyamicacid and/or polyimide by evaporation, displacement or diffusion. Other typical compounds of this preferred class of solvents are: N,N-dimethylmethoxy acetamide, N-methyl caprolactam and mixtures thereof. Other solvents which may be used in the present invention include: dimethylsulfoxide, N-methyl-2-pyrrolidone, tetramethyl urea, pyridine, dimethylsulfone, hexanethylphosphoramide, tetramethylene sulfone, formamide, N-methylformamide, butylrolacetone. The solvents can be used alone, in combinations of solvents, or in combination with poor solvents such as benzene, benzonitrile, dioxane, xylene, toluene and cyclohexane if desired.

As indicated in Block 30, the reactants necessary to produce the desired rod-like polymide polymers are then dissolved in the thermoplastic/solvent solution.

The preferred rod-like aromatic heterocyclic polymers for use in the practice of the present invention are polyimides. Examples of other rod-like polymers that can be used include those disclosed by one of use in U.S. Pat. No. 4,108,835, the disclosure of which is incorporated herein by reference.

In the preparation of a polyimide rigid rod polymer, any suitable diamine may be used. Typical diamines include o, m, or p-phenylene diamine, 4,4'-diamino-diphenyl propane, 4,4'-diamino-diphenyl methane, 4,4'-diamino-diphenylamine benzidine, 4,4'-diamino-diphenyl sulfide, 4,4'-diamino-diphenyl sulfone, 4,4'-diamino-diphenyl ether, bis-(4-amino-phenyl) diethyl silane, bis-(4-amino-phenyl) phenyl phosphine oxide, bis-(4-amino-phenyl)-N-methylamine, 1,5 diamino napthalene, 3,3'-dimethyl-4,4'-diamino-biphenyl, 3,3'dimethoxybenzidine, 2,6 dianilinobenzoxazole, 2,6 dianilinobenzimidazole and 2,6 dianilinobenzothiazole.

Of these p-phenylene diamine or the diaminoazoles are preferred because they will produce high strength polyimide rigid rods.

Any suitable dianhydride may be used in the preparation of the polyimide. Illustrative dianhydrides include: pyromellitic dianhydride; benzophenone tetracarboxylic dianhydride 2,3,6,7-naphthalene tetracarboxylic dianhydride; 3,3',4,4'-diphenyl tetracarboxylic dianhydride; 1,2,5,6-naphthalene tetracarboxylic dianhydride; 2,2', 3,3'-diphenyl tetracarboxylic dianhydride; 2,2-bis(3,4-dicarboxyphenyl) propane dianhydride; bis(3,4-dicarboxyphenyl) sulfone dianhydride; bis(3,4-dicarboxyphenyl) ether dianhydride; 2,2-bis(2,3-dicarboxyphenyl) propane dianhydride; 1,1-bis(2,3-dicarboxyphenyl) ethane dianhydride; bis(2,3-dicarboxyphenyl) methane dianhydride; bis(3,4-dicarboxyphenyl) methane dianhydride; sulfone dianhydride; 3,4,3',4'-benzophenone tetracarboxylic dianhydride, and mixtures thereof.

Various additives may be included to vary physical or polymerization characteristics of the material. For example, suitable surfactants, fillers, reinforcing materials, etc. may be used if desired. Polyfunctional molecules may be included to produce "star polymer" rigid rods. Star polymers, as the term suggests, are formed from a central molecule which has multiple reactive groups. The polymer chains then grow outwardly from this reactive center. In a typical case, the central molecule is the melamine which is a trifunctional molecule. The three amine groups react with the dianhydride to begin the polymerization process and propagation is conducted by a stepwise process. There is a possibility of crosslinking if the reactive ends from two different stars react; however, due to thermodynamic and solution characteristics, this effect is relatively insignificant. Typical polyfunctional amine molecules include melamine, 1,2,4,5-tetraaminobenzene, 1,3,6,7-tetraaminobiphenyl and mixtures thereof. Of these, pyromellitic dianhydride is preferred because it produces particularly strong polyimide rigid rod polymers.

As indicated in Block 40, a catalytic cyclizing agent is added to the solution to cause partial cyclization.

A process for converting the polyamic-acid composition to the isoimide thereof is a chemical treatment and involves treating the polyamic-acid composition with a dehydrating agent alone or in combination with a tertiary amine, e.g., acetic anhydride or an acetic anhydride-pyridine mixture. The ratio of acetic anhydride to pyridine may vary from just above zero to nearly infinite mixtures. It is believed that the pyridine functions as a catalyst for the action of the cyclizing agent, the acetic anhydride. Other dehydrating agents include propionic anhydride, butyric anhydride, valeric anhydride and mixed lower fatty-acid anhydrides. Other tertiary amine catalysts include triethylamine, isoquinoline, alpha, beta, or gamma-picoline and 2,5-lutidine.

A second embodiment of this process for conversion involves treatment with a carbodiimide, e.g., dicyclohexylcarbodiimide. The carbodiimide also serves to dehydrate the polyamic-acid and to act as an effective cyclizing agent.

As indicated in Block 50 upon completion of the catalyzed reaction, the cyclizing agent is removed, such as by filtration.

The polymer mix is then placed on a suitable surface, generally as a thin film, and heated to cause at least partial imidization as indicated in Block 60. The resulting film may be given any suitable treatment such as reshaping (Block 70) or laminating into structures having greater thickness (Block 80).

A thin film of the polymer mix is formed on a forming surface by removal of solvent. Any suitable method such as vacuum casting, sublimation, evaporation or distillation may be used. Of these, vacuum casting is preferred because the rate of solvent removal can more easily be controlled to produce homogeneous films.

The finished film may be reshaped, laminated or otherwise treated as desired. A number of sheets may be stacked and subjected to pressure, typically 10 to 100 psi while heating to a temperature of from about 60° to 150° C. for from about one to two hours. The film or laminate is heated to a temperature from about 100° to 300° C. for from about one to five hours to complete imidization.

As indicated in Block 90, (or as part of any reshaping or laminating step) the material is heated as described to complete imidization.

Further details of the invention and several preferred embodiments of the method thereof will be further understood upon reference to the following examples. Parts and percentages are by weight unless otherwise indicated.

EXAMPLE I

A film containing about 10 wt % solids of which about 21 wt % is rigid rod polymer is prepared. About 15.8 grams of polyetherimide thermoplastic is placed in a 3 neck round bottom flask. The polymer is dried for about 2 days at approximately 120° C. About 192.0 ml of HPLC grade N,N'-dimethyl acetamide (DMAC) that has been dried over molecular sieves for at least 12 hours is then added to the flask. The mixture is heated to approximately 60° C. and stirred overnight to complete dissolution of the thermoplastic. Next about 1.05 g (9.65 mmole) p-phenylene diamine (pPD) is added to the reaction vessel and allowed to dissolve. The mixture is then cooled to room temperature and an equimolar amount (about 3.15 g) of benzophenonetetracarboxylic dianhydride (BTDA) is added incrementally over a period of 6-8 hours. The mixture is allowed to react overnight resulting in a clear amber colored liquid. About 0.125 g (2.41 mmole) of dicyclohexylcarbodiimide (DCCI) is then added to the reactor and allowed to react overnight. The by-product from the isoimide formation then precipitates out of solution and is filtered off.

The filtered mixture is then poured onto a watch glass and placed in a vacuum oven at greater than about 25 in Hg and held at room temperature for about 2 hours. The material is then heated for about 3 hours at about 40° C., about 3 hours at about 60° C. and then held at about 80° C. for about 16 hours. The resulting film is a clear yellow, high strength, pliable material.

EXAMPLE II-XII

| Example | % Solid | % Rigid Rod | Thermoplastic | DMAC | pPD | BTDA |
|---|---|---|---|---|---|---|
| II | 3 | 70 | 0.9 g | 97 ml | 0.525 g | 1.575 g |
| III | 4 | 60 | 1.6 g | 96 ml | 0.6 g | 1.8 g |
| IV | 5 | 50 | 2.5 g | 95 ml | 0.625 g | 1.875 g |
| V | 6 | 40 | 3.6 g | 94 ml | 0.6 g | 1.8 g |
| VI | 7 | 35 | 4.55 g | 93 ml | 0.613 g | 1.838 g |
| VII | 9 | 28 | 6.48 g | 91 ml | 0.63 g | 1.89 g |
| VIII | 10 | 25 | 7.5 g | 90 ml | 0.625 g | 1.875 g |
| IX | 13 | 18 | 10.66 g | 87 ml | 0.585 g | 1.755 g |
| X | 5 | 10 | 13.5 g | 85 ml | 0.375 g | 1.125 g |
| XI | 16 | 7.5 | 14.8 g | 84 ml | 0.3 g | 0.9 g |
| XII | 17 | 5 | 16.15 | 83 ml | 0.205 g | 0.638 g |

The solids content and proportion of the solids which are the rigid rod polymer can be varied within the basic process described in Example I. All ingredients, steps and conditions are substantially unchanged except the quantity of the polyetherimide thermoplastic, DMAC, pPD and BTDA. In each case, a homogeneous yellow film results. Strength decreases and flexibility increases as the percent rigid rod polymer inclusion decreases.

EXAMPLE XII

The steps of Example I are repeated except that the filtered mixture is cured as follows. The filtered a molecular composite mixture is poured into a casting vessel and placed in a vacuum oven. The mixture is cured for about 1 hour at room temperature under vacuum greater than about 25 in Hg, followed by about 16 hours at about 40° C., abouut 2 hours at about 60° C. and about 2 hours at about 80° C. A high strength, flexible yellow film results.

EXAMPLE XIV

The steps of Example I are repeated except that the filtered mixture is cured as follows. The molecular composite mixture is poured into a casting vessel and placed in a vacuum oven. The mixture is cured for about 2 hours at room temperature under vacuum greater than about 25 in Hg, followed by about 16 hours at about 60° C. The resulting film is a clear yellow, pliable, high strength material.

EXAMPLE XV

Example I is repeated, with the cure conditions modified as follows. The a molecular composite mixture is poured into a casting vessel and placed in a vacuum oven. The mixture is cured for about 3 hours at room temperature under vacuum greater than about 25 in Hg, followed by about 16 hours at about 40° C. and about 24 hours at about 80° C. The resulting film has excellent strength and flexibility.

EXAMPLE XVI

Using the film produced in Example I, post cure under about 100 psi pressure while inducing a vacuum of no less than about 10 in Hg. Cure for about 1 hour at about 100° C. followed by 1 hour at 200 and 1 hour at 300 C. The resulting film is an amber colored film with increasd rigidity.

EXAMPLE XVII

The film produced in Example I, is post cured under about 100 psi pressure while inducing a vacuum of no less than about 25 in Hg. Cure is continued for about 3 hours at about 230° C. The resulting film is an amber colored film with increased rigidity.

EXAMPLE XVIII

The film produced in Example I, is post cured under about 100 psi pressure while inducing a vacuum of no less than about 25 in Hg. Cure conditions are maintained for about 3 hours at about 250° C. The resulting film is an amber colored film with increased rigidity.

EXAMPLE XIX

The film produced in Example I, is post cured under about 100 psi pressure while inducing a vacuum of no less than about 25 in Hg. Cure is continued for about 5 hours at about 250° C. The resulting film is an amber colored film with increased rigidity.

EXAMPLE XX

Several layers of the film produced in Example I are stacked upon Teflon fluorocarbon film which is covering a flat tool. A layer of perforated Teflon film is placed on the stack, followed by a layer each of Teflon coated glass, 2 plies of 120 glass matt and 2 plies of 181 glass mat. The entire sandwich of material is placed in a vacuum bag. A vacuum greater than about 25 in. Hg is applied and the assembly is placed in an autoclave and heated for about 5 hours at about 250° C. to produce a thick laminate structure of the composite.

EXAMPLE XXI

The method described in Example I is repeated, except that about 0.9 g. of the polyetherimide thermoplastic, about 97.0 ml of DMAC and about 0.525 g. of o-phenylene diamine and about 1.525 g. of BTDA are used. The mixture prior to casting has a solids content of about 10 wt. % of which about 20 wt. % is the rigid rod inclusion. A homogeneous yellow film results.

EXAMPLE XXII

The method described in Example XXII is repeated, except that the o-phenylene diamine is replaced with m-phenylene diamine. The resulting mixture prior to casting has a solids content of about 10 wt. % of which about 21 wt. % is the rigid rod inclusion. An excellent clear yellow film results.

EXAMPLE XXIII

A mixture can be produced with a 10% solids content of which about 21% is the rigid rod inclusion. To prepare this solution add about 0.9 g of polyetherimide thermoplastic, about 97.0 ml of DMAC, about 0.525 g of p-phenylene diamine and about 1.575 g of BTDA as described previously. In this case, about 0.0122 g of melamine is also added in order to form "star polymer" rigid rods. After the polymerization has proceeded overnight, about 0.125 g of DCCI is added to produce the isoimide form of the star polyimides. The material is filtered as described in Example I and heated in a vacuum oven at greater than about 25 in HG and held at room temperature for about 2 hours. The material is then heated for about 3 hours at about 40° C., 3 hours at about 60° C. and 16 hours at about 80° C. The resulting material is a clear yellow high strength, pliable material.

EXAMPLE XXIV

According to the process described in Example I a mixture can be produced with a 10% solids content of which about 21% is the rigid rod inclusion. To prepare this solution add about 10 g of polyetherimide thermoplastic to about 90 ml of DMAC. About 1.1245 g of di(aminophenyl)benzothiazole and about 0.9755 g of BTDA are then added as described previously. After the reaction has proceeded overnight, about 0.125 g of DCCI is added to the solution and allowed to react overnight. The solution is then filtered and the film processed as described previously. This will produce a clear, high strength, homogeneous film.

EXAMPLE XXV

According to the process described in Example I a mixture can be produced with a 10% solids content of which about 21% is the rigid rod inclusion. To prepare this solution add about 10 g of LaRC-TPI thermoplastic, polyimide based material available from Rogers Chemical Co., to about 90.0 ml of DMAC. About 1.0285 g of di(aminophenyl)benzoxazole and about 1.15 g of pyromellitic dianhydride are added as described previously. After the reaction has proceeded overnight, about 0.125 g of DCCI is added to the solution and allowed to react overnight. The solution is then filtered and the film processed as described previously. This will produce a clear, high strength, homogeneous film.

EXAMPLE XXVI

According to the process described in Example I a mixture can be produced with a 10% solids content of which about 21% is the rigid rod inclusion. To prepare this solution add about 10 g of Avimide K-III thermoplastic to about 90.0 ml of DMAC. About 1.0223 g of di(aminophenyl)benzoimidazole and about 1.0364 g of oxyphenylenedianhydride are added as described previously. After the reaction has proceeded overnight, 0.125 g of DCCI is added to the solution and allowed to react overnight. The solution is then filtered and the film processed as described previously. This will produce a clear, high strength, homogeneous film.

While various preferred materials, processing conditions and other parameters were detailed in the above description of preferred embodiments, those may be varied, where suitable, with similar results. For example various fillers, surfactants, colorants and other additives may be used where desired. Other variations, applications and ramifications of the present invention will occur to those skilled in the art upon reading the present disclosure. Those are intended to be included within the scope of this invention as defined in the appended claims.

I claim:

1. The method of preparing a polymeric product comprising a substantially uniform mixture of rod shaped polyimide polymer molecules dispersed in a coil shaped polymer matrix, which comprises the steps of:
   providing a polyetherimide having coil shaped polymer molecules;
   dissolving said polyetherimide in a solvent;
   adding thereto a dianhydride and a diamine;
   reacting said dianhydride and diamine to form a polyamic acid;
   adding thereto a cyclizing agent to cause said polyamic acid to partially cyclize to a polyimide;
   removing excess cyclizing agent;
   heating the resulting mixture to at least a shape-retaining structural state; and
   heating the shape-retaining structure to complete polymerization of said polyimide;
   whereby a structure having rod shaped molecules substantially uniformly dispersed in coil shaped matrix molecules results.

2. The method according to claim 1 wherein said solvent comprises a solvent selected from the group consisting of N,N-dialkylcarboxylamide, N-methyl-2-pyrrolidone, tetramethyl urea, pyridine, dimethylsulfone, hexanethylphosphoramide, tetramethylene sulfone, formamide, N-methylformamide, butylrolacetone and mixtures thereof.

3. The method according to claim 1 wherein said solvent is an N,N-dialkylcarboxylamide.

4. The method according to claim 3 wherein said N,N-dialkylcarboxyamide is selected from the group consisting of N,N-dimethylformamide, N,N-dimethylacetamide, N,N-dimethylmethoxy acetamide, and mixtures thereof.

5. The method according to claim 4 wherein said N,N-dialkylcarboxyamide is selected from the group consisting of N,N-dimethylformamide and N,N-dimethylacetamide.

6. The method according to claim 1 wherein said diamine is selected from the group consisting of phenylene diamines, diaminoazoles and mixtures thereof.

7. The method according to claim 1 wherein said diamine is selected from the group consisting of o-phenylene diamine, m-phenylene diamine, p-phenylene diamine, 2,6-dianilinobenzoxazole, 2,6-dianilinobenzimidazole, 2,6-dianilinobenzothiazole and mixtures thereof.

8. The method according to claim 1 wherein said dianhydride is pyromellitic dianhydride.

9. The method according to claim 1 wherein said cyclizing agent comprises a dehydrating agent or a combination of a dehydrating agent and a tertiary amine.

10. The method according to claim 9 wherein said dehydrating agent is selected from the group consisting of a carbodiimide, acetic anhydride, propionic anhydride, butyric anhydride, valeric anhydride, mixed fatty-acid anhydrides and mixtures thereof.

11. The method according to claim 9 wherein said tertiary amine is selected from the group consisting of pyridine, triethylamine, isoquinoline, picoline, 2,5-lutidine and mixtures thereof.

12. The method according to claim 9 wherein said cyclizing agent is selected from the group consisting of dicyclohexylcarbodiimide and a mixture of acetic anhydride and pyridine.

13. The method according to claim 1 wherein said excess cyclizing agent is removed by filtration.

14. The method according to claim 1 wherein said shape-retaining structure is physically reshaped prior to said heating to complete polymerization.

* * * * *